US010572254B2

(12) United States Patent
Greiner et al.

(10) Patent No.: US 10,572,254 B2
(45) Date of Patent: *Feb. 25, 2020

(54) INSTRUCTION TO QUERY CACHE RESIDENCY

(71) Applicant: INTERNATIONAL BUSINESS MACHINES CORPORATION, Armonk, NY (US)

(72) Inventors: Dan F. Greiner, San Jose, CA (US); Michael K. Gschwind, Chappaqua, NY (US); Christian Jacobi, Poughkeepsie, NY (US); Anthony Saporito, Highland, NY (US); Chung-Lung K. Shum, Wappingers Falls, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,574

(22) Filed: Nov. 6, 2017

(65) Prior Publication Data

US 2018/0060241 A1 Mar. 1, 2018

Related U.S. Application Data

(63) Continuation of application No. 15/214,577, filed on Jul. 20, 2016.

(51) Int. Cl.
| G06F 9/30 | (2018.01) |
| G06F 12/08 | (2016.01) |
| G06F 12/0811 | (2016.01) |
| G06F 12/0893 | (2016.01) |

(52) U.S. Cl.
CPC ........ *G06F 9/3004* (2013.01); *G06F 9/30047* (2013.01); *G06F 12/0811* (2013.01); *G06F 12/0893* (2013.01); *G06F 2212/62* (2013.01)

(58) Field of Classification Search
CPC ............... G06F 9/3004; G06F 9/30047; G06F 12/0811; G06F 12/0893
See application file for complete search history.

(56) References Cited

U.S. PATENT DOCUMENTS

| 5,392,443 A | 2/1995 | Sakakibara |
| 5,758,119 A | 5/1998 | Mayfield et al. |
| 5,802,569 A | 9/1998 | Genduso |
| 5,835,967 A | 11/1998 | McMahan |
| 5,948,081 A | 9/1999 | Foster |

(Continued)

OTHER PUBLICATIONS

Mel, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Benjamin P Geib
(74) *Attorney, Agent, or Firm* — Steven Chiu, Esq.; Blanche E. Schiller, Esq.; Heslin Rothenberg Farley & Mesiti P.C.

(57) ABSTRACT

A query is performed to obtain cache residency and/or other information regarding selected data. The data to be queried is data of a cache line, prefetched or otherwise. The capability includes a Query Cache instruction that obtains cache residency information and/or other information and returns an indication of the requested information.

11 Claims, 8 Drawing Sheets

(56) References Cited

U.S. PATENT DOCUMENTS

| | | | |
|---|---|---|---|
| 6,055,621 | A | 4/2000 | Puzak |
| 6,560,693 | B1 | 5/2003 | Puzak et al. |
| 6,574,713 | B1 | 6/2003 | Kosche |
| 6,662,273 | B1 | 12/2003 | Wilkerson |
| 7,222,217 | B2 | 5/2007 | Gray |
| 7,350,030 | B2 | 3/2008 | Rotithor et al. |
| 7,386,683 | B2 | 6/2008 | Blumrich et al. |
| 7,506,105 | B2 | 3/2009 | Al-Sukhni et al. |
| 7,840,761 | B2 | 11/2010 | Colavin |
| 7,958,316 | B2 | 6/2011 | Speight et al. |
| 7,958,317 | B2 | 6/2011 | Speight et al. |
| 8,135,642 | B1 | 3/2012 | Krause |
| 8,255,631 | B2 | 8/2012 | Chen et al. |
| 8,266,344 | B1 | 9/2012 | Lampert |
| 8,707,014 | B2 | 4/2014 | Yamazaki |
| 8,812,822 | B2 | 8/2014 | Luick |
| 9,081,501 | B2 | 7/2015 | Asaad et al. |
| 10,169,239 | B2 | 1/2019 | Greiner et al. |
| 2002/0087802 | A1 | 7/2002 | Al-Dajani |
| 2002/0099913 | A1 | 7/2002 | Steely, Jr. |
| 2002/0144054 | A1 | 10/2002 | Fanning |
| 2002/0174303 | A1 | 11/2002 | Gelman |
| 2003/0005419 | A1 | 1/2003 | Pieper |
| 2003/0046494 | A1 | 3/2003 | Ziegler |
| 2004/0049640 | A1 | 3/2004 | So |
| 2004/0268045 | A1 | 12/2004 | Gray |
| 2005/0175027 | A1 | 8/2005 | Miller |
| 2006/0136228 | A1 | 6/2006 | Lin |
| 2006/0143401 | A1 | 6/2006 | Doweck et al. |
| 2006/0274750 | A1 | 12/2006 | Babbar |
| 2008/0091921 | A1 | 4/2008 | Abuaiadh et al. |
| 2009/0199190 | A1 | 8/2009 | Chen |
| 2010/0010965 | A1 | 1/2010 | Edlund et al. |
| 2011/0307455 | A1 | 12/2011 | Gupta |
| 2012/0226892 | A1 | 9/2012 | Tirumalai et al. |
| 2013/0151784 | A1 | 6/2013 | Bell |
| 2013/0159630 | A1 | 6/2013 | Lichmanov |
| 2013/0282987 | A1 | 10/2013 | Koob |
| 2013/0332705 | A1 | 12/2013 | Martinez |
| 2013/0346694 | A1 | 12/2013 | Krick |
| 2014/0115245 | A1 | 4/2014 | Maybee et al. |
| 2014/0129773 | A1 | 5/2014 | Habermann et al. |
| 2014/0156932 | A1 | 6/2014 | Dundas |
| 2014/0281248 | A1 | 9/2014 | Alameldeen |
| 2015/0058308 | A1 | 2/2015 | Zheng |
| 2015/0089139 | A1 | 3/2015 | Zaks |
| 2015/0095577 | A1 | 4/2015 | Vijayrao et al. |
| 2015/0142762 | A1 | 5/2015 | Konik et al. |
| 2015/0143082 | A1 | 5/2015 | Smith |
| 2015/0161065 | A1 | 6/2015 | Lunadier |
| 2015/0309944 | A1 | 10/2015 | Sadoughi-Yarandi et al. |
| 2015/0331800 | A1 | 11/2015 | Kimura |
| 2015/0378917 | A1 | 12/2015 | Busaba et al. |
| 2015/0378918 | A1 | 12/2015 | Busaba et al. |
| 2016/0026580 | A1 | 1/2016 | Dooley et al. |
| 2016/0314069 | A1 | 10/2016 | Luttrell |
| 2017/0024165 | A1 | 1/2017 | Kazama |
| 2017/0046202 | A1 | 2/2017 | Bao |
| 2017/0123979 | A1 | 5/2017 | V |
| 2017/0132124 | A1 | 5/2017 | Gschwind |
| 2017/0132133 | A1 | 5/2017 | Gschwind |
| 2017/0132134 | A1 | 5/2017 | Gschwind |
| 2017/0132135 | A1 | 5/2017 | Gschwind |
| 2017/0132147 | A1 | 5/2017 | Loh |
| 2018/0024836 | A1 | 1/2018 | Greiner et al. |
| 2018/0024930 | A1 | 1/2018 | Greiner et al. |
| 2018/0024933 | A1 | 1/2018 | Greiner et al. |
| 2019/0138497 | A1 | 5/2019 | Gadde et al. |
| 2019/0171835 | A1 | 6/2019 | Kumar et al. |

OTHER PUBLICATIONS

IBM, "z/Architecture—Principles of Operation," SA22-7832-10, Eleventh Edition, Mar. 20, 2015, pp. 1-1732.

IBM, "Power ISA—V2.07B," Apr. 9, 2015, pp. 1-1527.

Chen, Yong et al., "Global-aware and multi-order context-based prefetching for high-performance processors," The International Journal of High Performance Computing Applications, Mar. 31, 2016, pp. 1-16.

Anonymous, "Prefetching Mechanism with Cache-Aware Optimized Control," IPCOM000211215D, Sep. 27, 2011, p. 1 (+ cover).

Ailamaki, Anastassia et al., "DBMSs on a Modern Processor: Where Does Time Go?," Proceedings of the 25th VLDB Conference, Edinburgh, Scotland, Sep. 1999, pp. 266-277.

Anonymous, "Method for Priority-Based Cache-Line Residency," IPCOM000128946, Sep. 2005, pp. 1-3 (+ cover).

Song, SP, "Methods of Specifying Data Prefetching Without Using a Separate Instruction," IPCOM000115743, Jun. 1, 1995, pp. 355-356 (+ cover).

Arnold, Ronny L., et al., "A Method for Qualifying Instruction Line Prefetch With a Line-Wrapped Cache," May 1996, pp. 161-163 (+ cover).

Johnson, Teresa L. et al., "Run-time Spatial Locality Detection and Optimization," Proceeding of the 30th Annual ACM/IEEE International Symposium on MicroArchitecture, Dec. 1997, pp. 57-64.

Liu, L., "Utilization-Based Prefetching," IPCOM000063165D, Feb. 1985, pp. 1-2 (+ cover).

Bennett, B.T., et al., "Prefetching in a Multilevel Memory Hierarchy," IPCOM000049471D, pp. 1-2 (+ cover).

Greiner, Dan F., et al., "Managing a Prefetch Queue Based on Priority Indications of Prefetch Requests," U.S. Appl. No. 15/214,549, filed Jul. 20, 2016, pp. 1-33.

Gschwind, Michael K., et al., "Processing Data Based on Cache Residency," U.S. Appl. No. 15/214,597, filed Jul. 20, 2016, pp. 1-42.

Gschwind, Michael K., et al., "Determining the Effectiveness of Prefetch Instructions," U.S. Appl. No. 15/214,624, filed Jul. 20, 2016, pp. 1-37.

Greiner, Dan F., "Instruction to Query Cache Residency", U.S. Appl. No. 15/214,577, filed Jul. 20, 2016, pp. 1-41.

List of IBM Patents or Patent Applications Treated as Related, Jan. 2, 2018, pp. 1-2.

INSTRUCTION TO QUERY CACHE RESIDENCY

CROSS-REFERENCE TO RELATED APPLICATIONS

This application is a continuation of co-pending U.S. application Ser. No. 15/214,577, entitled "INSTRUCTION TO QUERY CACHE RESIDENCY," filed Jul. 20, 2016, which is hereby incorporated herein by reference in its entirety.

BACKGROUND

One or more aspects relate, in general, to processing within a computing environment, and in particular, to processing associated with cache management.

Managed Runtime Environments, as well as other environments, may employ a garbage collection (GC) function to remove memory objects from a software heap that are no longer in use. This function typically has to access a large section, or perhaps all, of the heap to determine if an object is no longer referenced by any other object. Since a great deal of memory is accessed, the garbage collection function typically exploits prefetch instructions.

Examples of prefetch instructions include the Prefetch Data (PFD) and Prefetch Data Relative Long (PFDRL) instructions, as defined in the z/Architecture offered by International Business Machines Corporation, Armonk, N.Y. The prefetch instructions instruct the central processing unit (CPU) to prefetch data of a cache line into a local data cache prior to the time that data is needed. Therefore, when the CPU actually needs data from the cache line for a subsequent load or store instruction, it is typically already in the cache, or at least on its way to being delivered from a higher level cache or main memory.

In a Managed Runtime Environment (MRTE) or similar environment, the code that is generated is often compiled by a Just-In-Time (JIT) compiler using a JIT compilation technique. The JIT compiler typically generates prefetch instructions to improve performance by attempting to reduce the latency associated with cache misses. To achieve good performance, the proper placement of prefetch instructions is to be determined. Also, the scheduling of instructions can affect cache utilization. For instance, if a load can be scheduled far in advance of a dependent instruction, the latency of a cache miss may be hidden, entirely or partially.

SUMMARY

Shortcomings of the prior art are overcome and additional advantages are provided through the provision of a computer-implemented method of executing instructions within a computing environment. The method includes, for instance, obtaining an instruction for execution in the computing environment. The instruction is configured to provide: an address of data to be queried; and a plurality of parameters to control searching for the address in one or more caches, the plurality of parameters including a cache level parameter and a control parameter, the cache level parameter providing a cache level indication specifying a particular cache level to commence searching for the address and specifying that one or more other cache levels are available to be searched, and the control parameter indicating up to a selected cache level to be searched for the address. The instruction is executed and, the executing includes obtaining the address, and searching one or more caches on one or more cache levels for the address. The searching is controlled by the cache level parameter and the control parameter and is not to go beyond the selected cache level defined by the control parameter for searching the address. Information based on the searching is returned. The instruction facilitates obtaining information regarding selected data, which may be used to improve software code, software processing and/or system performance.

Computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a query capability is provided to obtain cache residency and/or other information regarding selected data. The data to be queried is data of a cache line, prefetched or otherwise. The capability includes a Query Cache instruction that obtains cache residency information and/or other information and returns an indication of the requested information. The JIT compiler or other software can then use that information in processing associated with various instructions, including prefetch instructions, load instructions and/or store instructions, as examples. The information may be used to determine where the instructions should be placed in code, etc., for optimization of the code.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE® is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y. USA.

The computing environment may also be based on other architectures, including, but not limited to, the Intel 64 and IA-32 architectures. Other examples also exist.

Figure 1A:
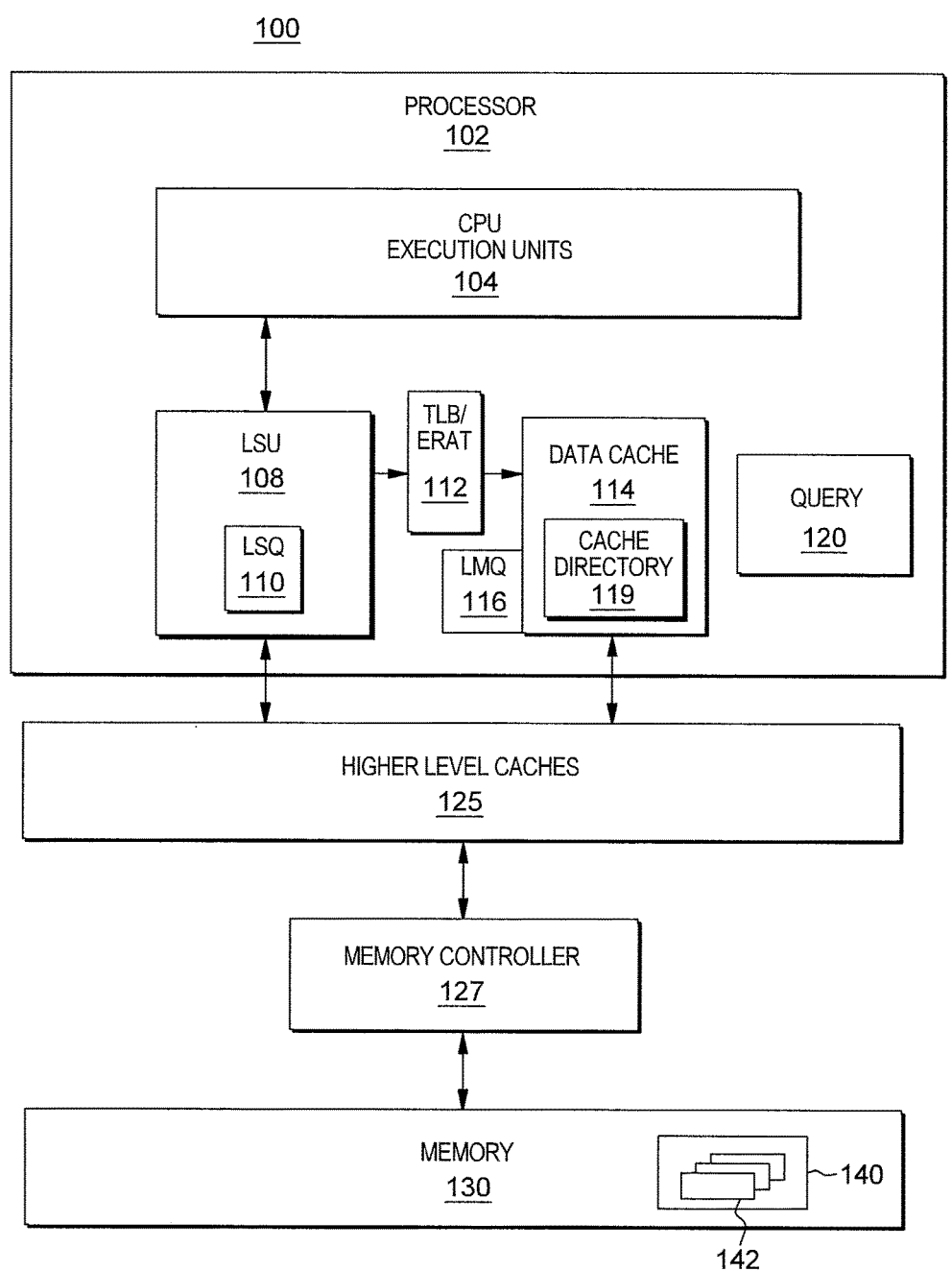
FIG. 1A depicts one example of a computing environment to incorporate and use one or more aspects of the present invention.

Referring to FIG. 1A, in one example, a computing environment 100 includes at least one central processing unit (CPU) 102 (a.k.a., a processor) coupled to one or more higher level caches 125. Central processing unit 102 includes, for instance, one or more execution units 104 to request and consume data. Execution units 104 are coupled to a load/store unit (LSU) 108, which includes a load/store queue (LSQ) 110. Load/store unit 108 issues memory access operations (loads and stores) that retrieve prefetched data or cause the data to be fetched from the memory subsystem or higher level caches. LSU 108 may be coupled to a data cache 114 via, e.g., a translation mechanism 112, indicated as, e.g., a translation look-aside buffer (TLB) or an effective to real address translation table (ERAT).

CPU 102 is coupled to and communicates with a memory hierarchy that includes, for instance, data cache 114, which is an L1 data cache; one or more higher level caches 125, which may include a single level two (L2) cache or multiple other sequentially numbered higher levels, e.g., L3, L4; a memory 130; and an associated memory controller 127, which controls accesses to memory 130. L1 data cache 114 serves as a prefetch buffer for data (and/or data streams) that are prefetched. L1 data cache 114 has a corresponding load miss queue (LMQ) 116, which the cache utilizes to save information about ongoing prefetch requests.

Figure 1B:
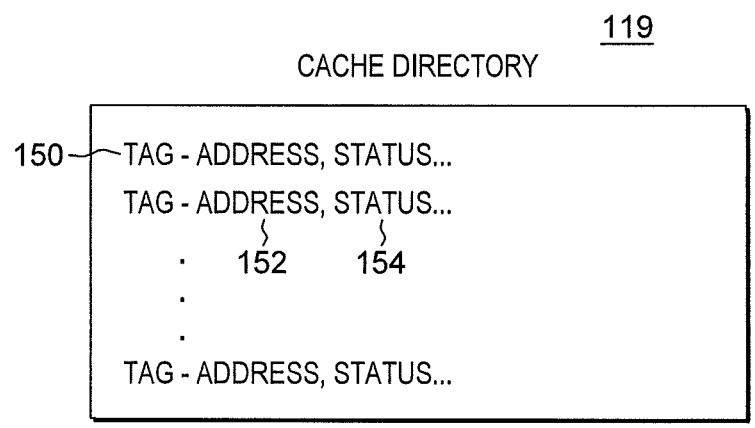
FIG. 1B depicts one example of a cache directory of a cache of the computing environment of FIG. 1A used in accordance with an aspect of the present invention.

Further, in one embodiment, data cache 114 has an associated cache directory 119, which may be implemented as part of the cache or be maintained separate therefrom. As depicted in FIG. 1B, cache directory 119 includes a tag 150 for each cache line in the L1 cache. The tag provides information about the cache line, including at least part of a real or absolute address 152 of the data in the cache line, as well as status information 154, such as whether the data is being held exclusive or shared, etc.; the use of the data, such as whether it is most recently used, least recently used, or somewhere in between, etc.; and/or other status information. The tag may also include additional information regarding the data in the cache line. Each cache level may have an associated cache directory, either its own directory or a shared directory.

Returning to FIG. 1A, memory 130 may include at least one program product having a set (e.g., at least one) of program modules that are configured to carry out the functions of embodiments of the invention. Program/utility 140, having a set (at least one) of program modules 142, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 142 may generally carry out the functions and/or methodologies of embodiments of the invention described herein.

In addition to the example memory hierarchy, computing environment 100 may also include additional storage devices that form a part of the memory hierarchy from the perspective of CPU 102. The storage devices may be one or more electronic storage media, such as a floppy disk, hard drive, CD-ROM, or DVD. CPU 102 communicates with each of the above devices within the memory hierarchy by various mechanisms, including via buses and/or direct channels, as examples.

The buses may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Video Electronics Standards Association (VESA) local bus, and Peripheral Component Interconnect (PCI) bus.

Processor 102 further includes query function 120, which uses a Query Cache instruction defined in accordance with an aspect of the present invention to query one or more caches to determine cache residency and/or other information for selected data, in accordance with an aspect of the present invention.

Figure 2:
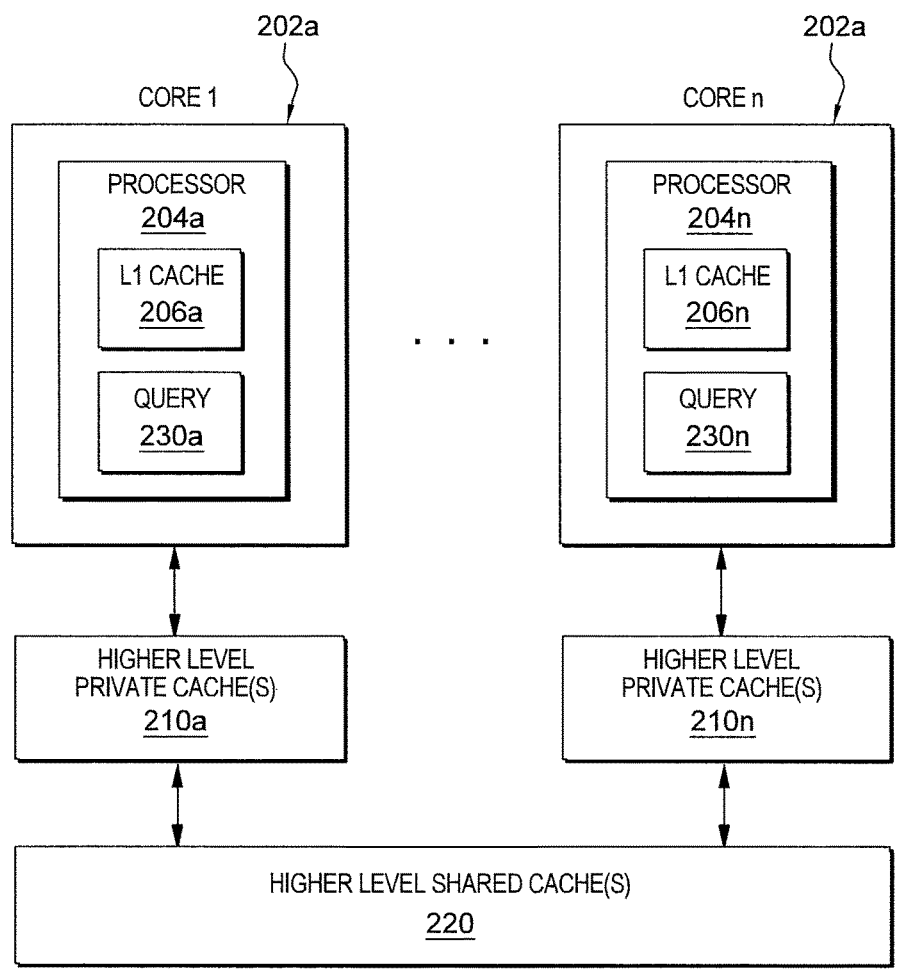
FIG. 2 depicts one example of a multiprocessor environment to incorporate and use one or more aspects of the present invention.

In a further embodiment, the query capability may be used in a multiprocessor environment, such as the one described with reference to FIG. 2. In one example, a multiprocessor environment 200 includes a plurality of cores 202a . . . 202n. Each core includes at least one hardware thread or processor 204a, 204n that includes a local cache, such as an L1 cache 206a, 206n. Each core 202a, 202n is coupled to zero or more higher level private caches 210a, 210n (e.g., L2 cache(s)). Additionally, multiprocessor environment 200 includes zero or more shared caches 220, such as L3 and/or L4 caches, which are shared between the cores. Other topologies may also exist.

Each processor in the multiprocessor environment (or a subset of the processors) may also include query function 230a, 230n to be used to query one or more of the caches, including one or more of the shared cache(s), if available, to obtain cache residency status and/or other information of selected data.

In accordance with an aspect of the present invention, to query the cache, a Query Cache (QCACHE) instruction, defined in accordance with an aspect of the present invention, is used, in one example. The Query Cache instruction is, for instance, an architected instruction (e.g., to be defined in an Instruction Set Architecture) that returns information on, for instance, where the particular memory address being queried is within the cache hierarchy (i.e., cache residency information), and/or other information regarding the data of the cache line. The Query Cache instruction, itself, does not actually load data into a register nor prefetch data into the cache; it only returns information. The information returned includes, for instance, cache residency information, such as the level of the cache in which the addressed data resides or whether the addressed data is in a specified level of cache, as examples, and/or additional information, such as state information, use information and/or latency values to name a few examples. The information returned depends on the format of the instruction and/or specified parameters of the instruction, as described below.

Although examples of a Query Cache instruction are provided below. These are just examples and there may be many variations to the examples provided. For instance, a Query Cache instruction may include different fields than described below, additional fields, and/or fewer fields. One or more of the fields described in the examples below may be optional and/or the information of one or more of the fields may be implicitly provided by the instruction, instead of explicitly indicated in a field of the instruction. Many variations are possible.

Figure 3A:
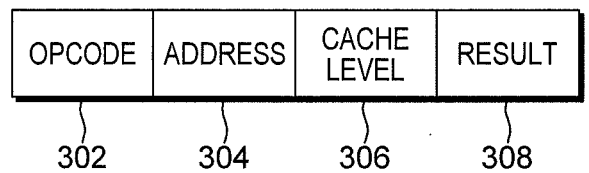
FIG. 3A depicts one example of a format of a Query Cache instruction used in accordance with an aspect of the present invention.

One particular embodiment of a Query Cache instruction is described with reference to FIG. 3A. In one example, a Query Cache instruction 300a includes one or more opcode fields, referred to herein as opcode field 302, to provide an operation code indicating this is a query cache operation; one or more address fields, referred to herein as address field 304; one or more cache level fields, referred to herein as cache level field 306; and one or more result fields, referred to herein as result field 308, each of which is described below.

Address field 304 provides an address of data for which cache residency and/or other information is to be returned. As examples, this address is the particular address to be searched and no translation is performed; however, in another example, the address is a logical address to be translated to another address, such as a real or absolute address. The resultant address, whether it be the provided address or the translated address, used to perform the search is referred to herein as the effective address, merely for convenience.

As indicated, if a logical address is provided, the logical address is translated to a real or absolute address, and the real or absolute address is used to query the cache hierarchy to determine the cache residency status and/or other information of the data. In one example, this translation is performed using Dynamic Address Translation (DAT). Dynamic Address Translation is the process of translating an address, such as a virtual or logical address, into a corresponding real or absolute address. One or more address translation tables are examined in a hierarchical manner to translate the logical address into the real or absolute address.

In a further example, to improve address translation, the translation mapping may be stored in an entry of a structure associated with address translation, such as a translation look-aside buffer (TLB). The TLB is a cache used by memory management hardware to improve virtual address translation speed. Thus, when an address is translated, the TLB is checked first, and if an entry exists for the address being translated, then the real or absolute address in that entry is used; otherwise, one or more address translation tables are examined in a hierarchical manner to translate the logical address.

As examples, address field 304 may include a designation of a register that includes the address, it may be defined as one or more immediate fields that specify the address, or it may be defined as a combination of a field that includes a register and other fields, such as immediate or displacement fields, the contents of which are used to form the address. Other variations are also possible, including, but not limited to, that the address is provided implicitly, rather than explicitly indicated by the instruction. In this case, the address field may not be included with the instruction and/or may not be used.

Cache level field 306 is an optional field used to specify a parameter to further control where to search for the address based on execution of the Query Cache instruction. Cache level field 306 specifies a cache level indication that designates one or more cache levels in which to search for the address. As examples, this field may include a designation of a register that includes the cache level indication, it may be defined as one or more immediate fields that specify the cache level indication, or it may be defined as a mask that represents a plurality of searching options, described below, each of which is selectable by setting a bit of the mask. Other variations are also possible, including, but not limited to, that the cache level indicator is provided implicitly, rather than explicitly indicated by the instruction. In this case, the cache level field may not be included with the instruction and/or may not be used.

Cache level field 306 may be used, in addition to specifying a cache level, to specify a number of different searching options. As examples, the searching options may include: an L1 query option that specifies that the L1 data cache is to be searched for the address designated by the instruction (e.g., using address field 304); a specific cache level query option that specifies a specific cache level in the cache hierarchy to search for the address; an inclusive cache level query option that specifies a particular cache level to be searched and all higher levels (or a subset thereof); or an all levels query option that specifies that all cache levels (or a subset thereof) are to be searched. Many possibilities exist.

Further details regarding the different options are described below:

L1 Query Option—With this option, the processor searches the cache directory (e.g., cache tags) of the L1 data cache for the address, and returns a result of whether the specified cache line is present in the L1 data cache. The result may be specified in result field 308, or as a condition code, or as a flag, etc.

Specific Cache Level Query Option—With this option, the processor searches the cache directory of the specified cache level for the address, and returns a result of whether the cache line containing that address is present in the specified cache level. The result may be specified in result field 308, or as a condition code, or as a flag, etc.

With this option, any of the cache levels may be specified, including a shared cache level.

Inclusive Cache Level Query Option—With this option, the processor searches the cache directory of the specified cache level, and possibly, one or more higher level caches for the address to determine if the address exists in any of the levels. For instance, the processor checks the directory of the L1 data cache, and if the address is in the directory, then it returns the result. However, if the address is not in the L1 data cache, then it checks the next higher level data cache (e.g., the L2 cache), and so forth, until the address is located or all the levels (or a subset) have been checked. The result may be specified in result field 308, or as a condition code, or as a flag, etc.

With this option, any of the cache levels may be specified, including a shared cache level.

Figure 3B:
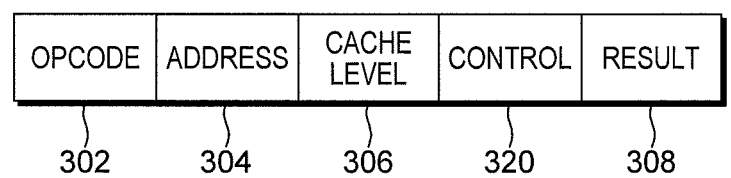
FIG. 3B depicts another example of a format of a Query Cache instruction used in accordance with an aspect of the present invention.

In a further embodiment, a control parameter is provided to restrict the levels that are checked. For instance, as shown in FIG. 3B, a Query Cache instruction 300b may include a control field 320 to be used with cache level parameter 306 that specifies, for this option (or another option), for instance, the highest level cache to be queried. This enhancement may improve the performance of the instruction, if it is known that no software performance can be achieved if the data is out beyond a certain level of cache. Control field 320 may include, as examples, a designation of a register that includes the additional parameter, it may be defined as one or more immediate fields that specify the additional parameter, or it may be a mask that represents a plurality of additional parameters, each of which is selectable by setting a bit of the mask. Other variations are also possible, including, but not limited to, that the control parameter is provided implicitly, rather than explicitly indicated by the instruction. In this case, the control field may not be included with the instruction and/or may not be used.

Query All Levels Option—With this option, the processor checks all cache levels and returns a value indicating the lowest level cache in which the specified cache line is present. The result may be specified in result field 308, or as a condition code, or as a flag, etc. Alternatively, a bit mask is returned (e.g., in the result field, in a specified register, in a specified memory location, etc.) indicating each level of the cache in which the specified cache line is present. For example, bit 0 of the bit mask represents the L1 data cache, bit 1 represents the L2 data cache, and so forth.

With this option, any of the cache levels may be searched, including a shared cache level.

The query all levels option may be defined to query up to a particular cache level for performance reasons. In this embodiment, control field 320 may be used that specifies, for instance, the highest level cache to be queried. This enhancement may improve the performance of the instruction.

Although various options are described above, other and/or different options may be provided. Further, in one embodiment, if cache level field 306 is not provided with the instruction, then the processor checks the one or more caches designated to be checked by architectural definition of the instruction. For instance, the Query Cache instruction may be architecturally defined to check the L1 data cache, if the cache level parameter is not provided. Other variations are also possible.

Result field 308 is an optional field that may include a result of the query. It may specify a register in which the result is to be stored; or provide an address of where to store the result; as examples. Other variations are also possible.

In yet another embodiment of the Query Cache instruction, one or more other parameters may be specified to request other information (e.g., state information, use information, latency values, etc.) based on executing the Query Cache instruction. In this example, the parameter is referred to as a status parameter, and may specify a number of options: including, for instance, the state of ownership, such as exclusive (owned by a particular processor and therefore may be stored to) or read-only (shared by a number of processors); the use status, such as most recently used, least recently used, or somewhere in between, etc.; and/or a latency value (e.g., # cycles to return the data, number of microseconds, etc.), as examples.

Figure 3C:
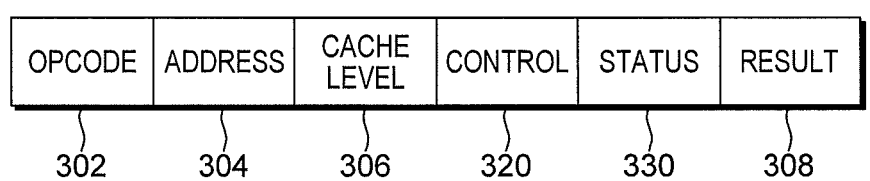
FIG. 3C depicts yet another example of a format of a Query Cache instruction used in accordance with an aspect of the present invention.

One embodiment of a Query Cache instruction that may return status information is described with reference to FIG. 3C. In this embodiment, one or more status fields, referred to herein as status field 330, may be used to request various information. For instance, status field 330 may request the state of ownership of the data, use status of the data, and/or latency values, as examples. The requested data is returned in, for instance, result field 308, as a condition code, in one or more flags, as a bit mask in a register or memory, etc.

If the state of ownership is requested, then this information is obtained from the particular cache directory (e.g., tag) in which the data was located. The returned data may indicate that the data is exclusively owned or shared, as examples.

Similarly, the use status may be obtained from the directory in which the address is located, and may indicate if the data has been used recently. In a further example, the use status may indicate a conflict level which indicates whether another core has the data and is actively using it, as an example. Other variations are also possible.

Additionally, the latency value may be provided by the processor. The cache subsystem returns to the processor information on how long it will take to actually fetch this data into the L1 cache (or another selected cache) to be used by the processor. The latency value may be in terms of a number of clock cycles, nanoseconds of time, or some other metric. This latency value is particularly useful to software where there are several higher level caches at the same level. For example, if an L4 cache is locally connected to this processor, the latency will be less than if the data is in a L4 cache that is remotely connected to this processor. The latency value is obtained, for instance, by using, e.g., benchmarks or timing diagrams, and then encoded into information returned by the query instruction.

Status field 330 may include a designation of a register that specifies the requested status, it may be defined as one or more immediate fields that specify the status requested, or it may be defined as a combination of a register field and other fields, such as immediate or displacement fields, used to specify the requested status. Further, it may be defined as a mask, in which one or more of the status options may be selected. Other variations are also possible, including, but not limited to, that the one or more status conditions are requested implicitly, rather than explicitly indicated by the instruction. In this case, the status field may not be included with the instruction and/or may not be used.

Many variations of the Query Cache instruction are possible. One or more of the above parameters, options or conditions may be combined in various ways to provide other variations of the Query Cache instruction. A particular implementation of the Query Cache instruction may have one or more of the fields described above depending on the desired information requested. Not all fields are required. In a further embodiment, an instruction may include all of the fields, and just use the one or more fields to obtain the desired information. Many variations are possible.

Further, a similar instruction (e.g., Query Instruction Cache) may be used to search instruction caches. Alternatively, a single instruction, e.g., the Query Cache instruction, may be configured to search the data caches, the instruction caches, or both. For instance, a type field may be included in the instruction to indicate whether to query data cache(s), instruction cache(s), or both. This type field may include, as examples, a designation of a register that includes the type of cache(s) to be searched, it may be defined in one or more immediate fields that specify the type of cache(s) to be searched, or it may be a mask that represents a plurality of options of types of cache(s) to be searched, each of which is selectable by setting a bit of the mask. Other variations are also possible, including, but not limited to, that the type indicator is provided implicitly, rather than explicitly indicated by the instruction.

One embodiment of the logic associated with processing a query cache instruction is described with reference to FIG. 4. This logic is performed by a processor, e.g., query function 120 of processor 102.

Figure 4:
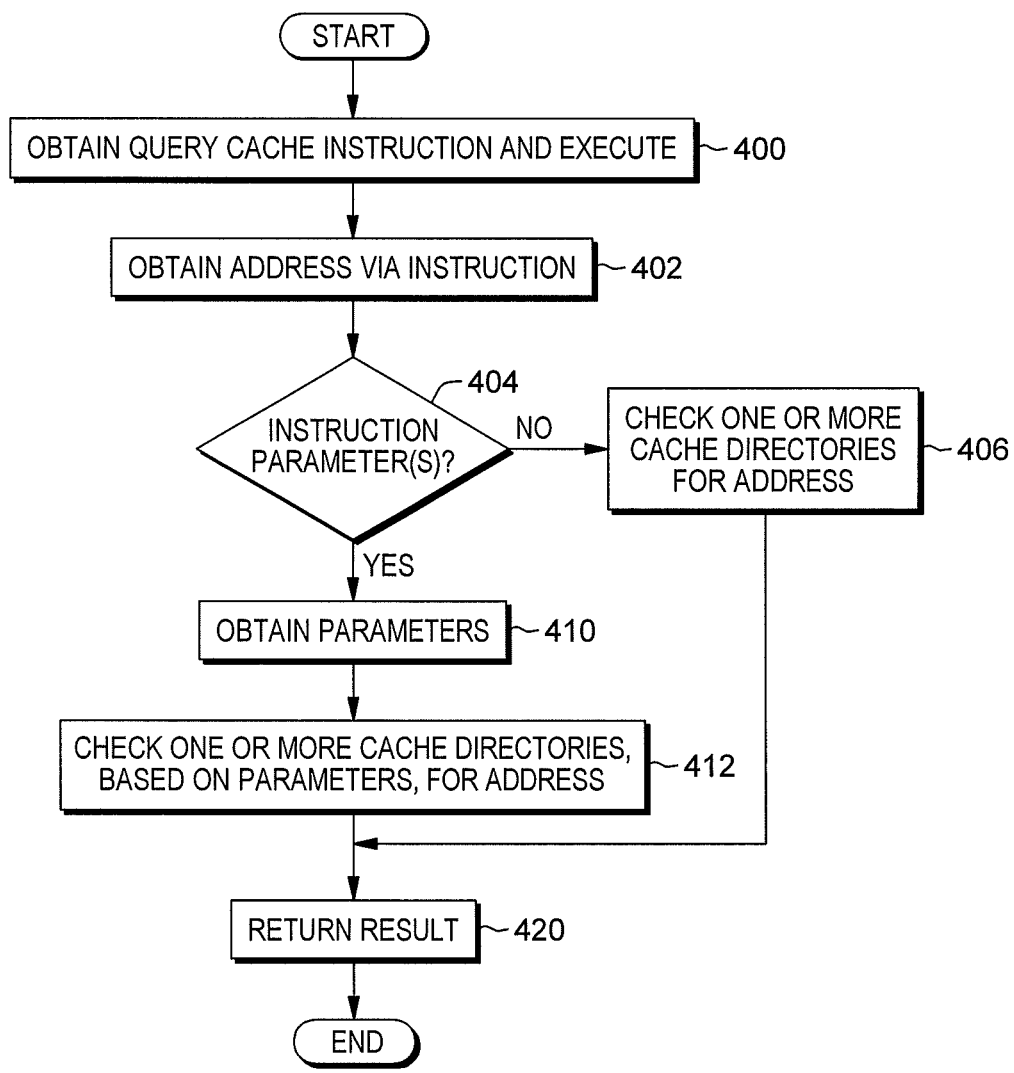
FIG. 4 depicts one example of logic associated with the Query Cache instructions of FIGS. 3A-3C, in accordance with an aspect of the present invention.

Referring to FIG. 4, a query cache instruction, such as Query Cache instruction 300a, 300b, or 300c, is obtained by the processor, STEP 400. An address is obtained either from address field 304 of the instruction or implicitly by the instruction, STEP 402. A determination is then made as to whether the query cache instruction is implemented with one or more parameters to further define the instruction, INQUIRY 404. If the Query Cache instruction does not include any parameters, then one or more cache directories are searched for the effective address, STEP 406. The directories to be searched are those that are architecturally defined to be searched based on execution of the Query Cache instruction, such as the L1 data cache, and/or one or more other caches. The result of this search is then returned, STEP 420. As examples, the result is returned in result field 308 or, as a condition code, a flag or other mechanism.

Returning to INQUIRY 404, if one or more parameters are specified by the instruction, either in a particular field of the instruction or implicitly, then the one or more parameters are obtained, STEP 410. These parameters are then used to define the search of the one or more cache directories for the address, STEP 412. For example, if the instruction specifies a specific cache level to be queried, then the address along with that parameter that indicates a cache level to be queried is used to determine the specific cache directories to be searched. A result of the search is then returned, STEP 420. For instance, this result may be returned in result field 308, or as a condition code, a flag or other mechanism.

As a further example, if the instruction requests particular status information to be returned, then the address and the status parameter are used to obtain the requested information, which is returned. Many other examples are possible.

Described in detail above are examples of a query cache instruction used to efficiently determine cache residency status and/or other information, enabling the JIT compiler or other software to make adjustments to improve processing, such as the placement of prefetch instructions, and enhance system performance.

In another example, the information may be used to process prefetched data. For instance, prefetched data may be processed based on cache residency of the prefetched data. The prefetched data is processed in an order based on when the data is actually ready to be processed (e.g., in the L1 cache), rather than in a fixed order, thereby improving system performance. Many other examples exist.

Figure 5A:
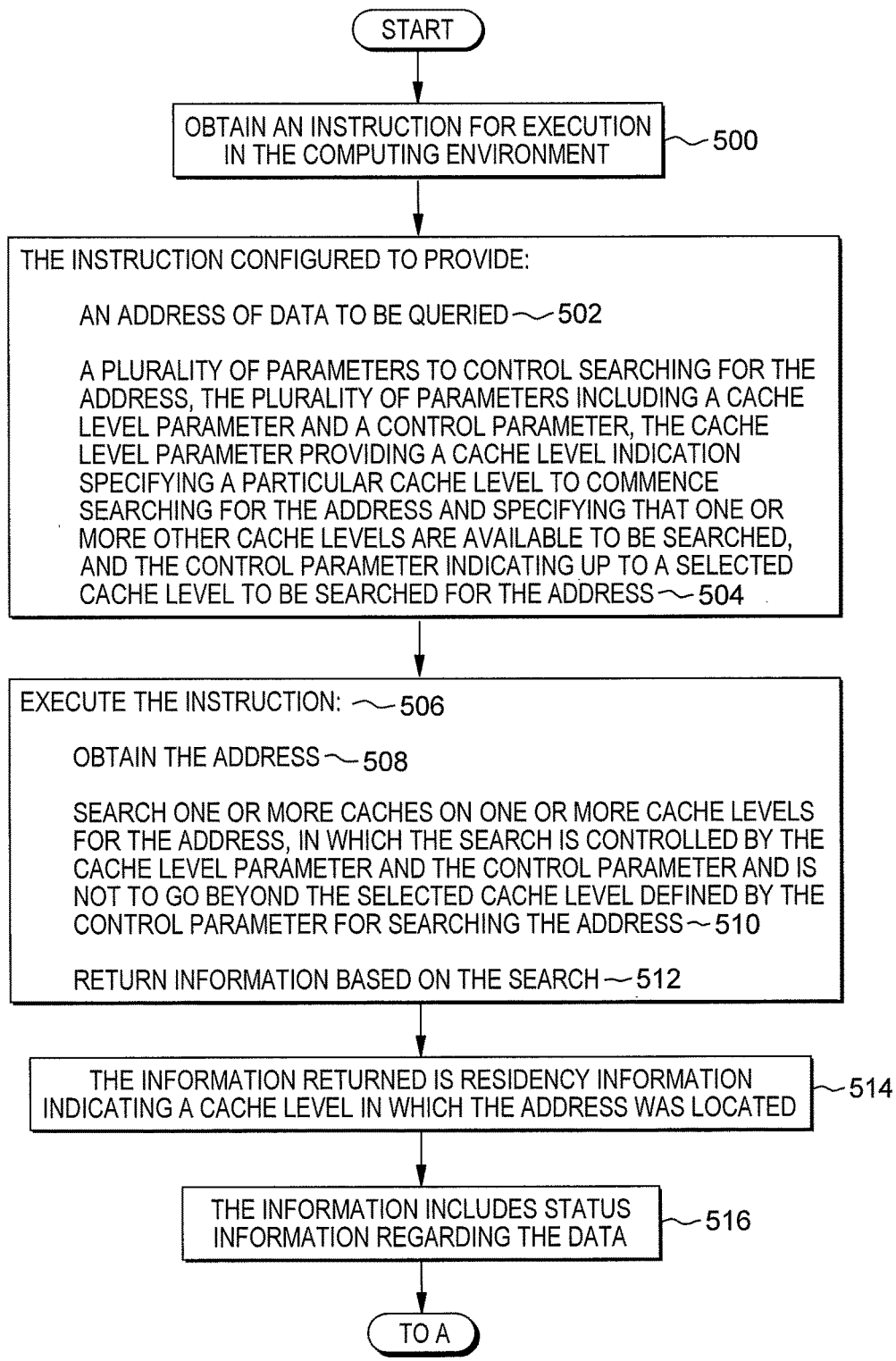
FIGS. 5A-5B depict further details of one embodiment of processing associated with a Query Cache instruction, in accordance with an aspect of the present invention.
Figure 5B:
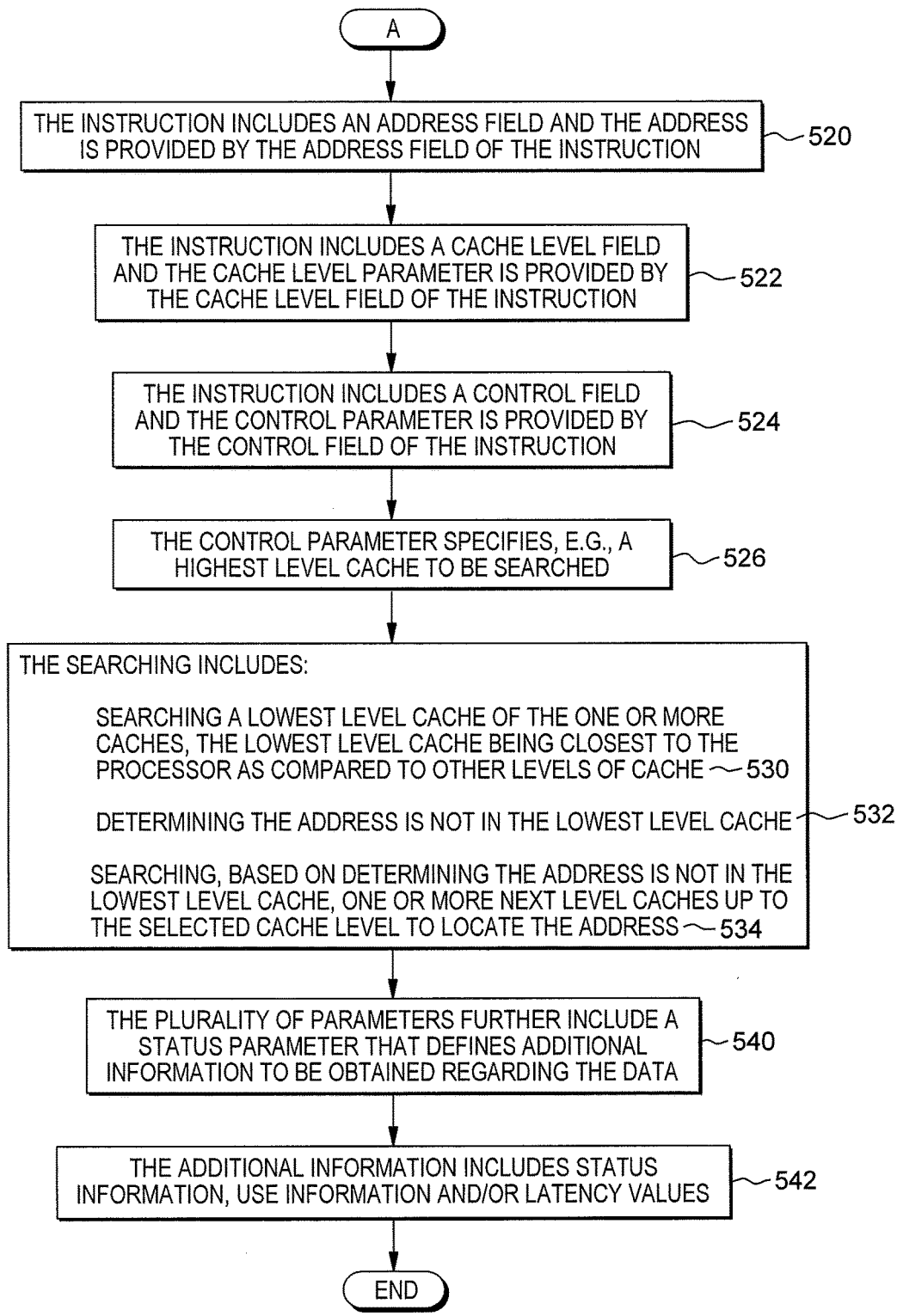

Further details regarding one embodiment of processing associated with a Query Cache instruction are described with reference to FIGS. 5A-5B. Referring initially to FIG. 5A, an instruction is obtained, by a processor, for execution in the computing environment (500). The instruction is configured to provide, for instance, an address of data to be queried (502), and a plurality of parameters to control searching for the address in one or more caches (504). The plurality of parameters include a cache level parameter and a control parameter. The cache level parameter provides a cache level indication specifying a particular cache level to commence searching for the address and specifies that one or more other cache levels are available to be searched; and the control parameter indicates up to a selected cache level to be searched for the address.

The instruction is executed (506), and the execution includes, for instance, obtaining the address (508), and searching one or more caches on one or more cache levels for the address, in which the search is controlled by the cache level parameter and the control parameter and is not to go beyond the selected cache level defined by the control parameter for searching the address (510).

Based on the search, information is returned (512), such as, for instance, residency information indicating a cache level in which the address was located (514) and/or status information regarding the data (516), as examples.

In one or more embodiments, the instruction includes one or more of: an address field and the address is provided by the address field of the instruction (520; FIG. 5B), a cache level field and the cache level parameter is provided by the cache level field of the instruction (522), and a control field and the control parameter is provided by the control field of the instruction (524). The control parameter specifies, e.g., a highest level cache to be searched (526).

In one example, the searching includes searching a lowest level cache of the one or more caches, the lowest level cache being closest to the processor as compared to other levels of cache (530), determining the address is not in the lowest level cache (532), and searching, based on determining the address is not in the lowest level cache, one or more next level caches up to the selected cache level to locate the address (534).

Further, in another aspect, the plurality of parameters further include a status parameter that defines additional information to be obtained regarding the data (540). The additional information includes, for instance, status information, use information and/or latency values (542).

Figure 6A:
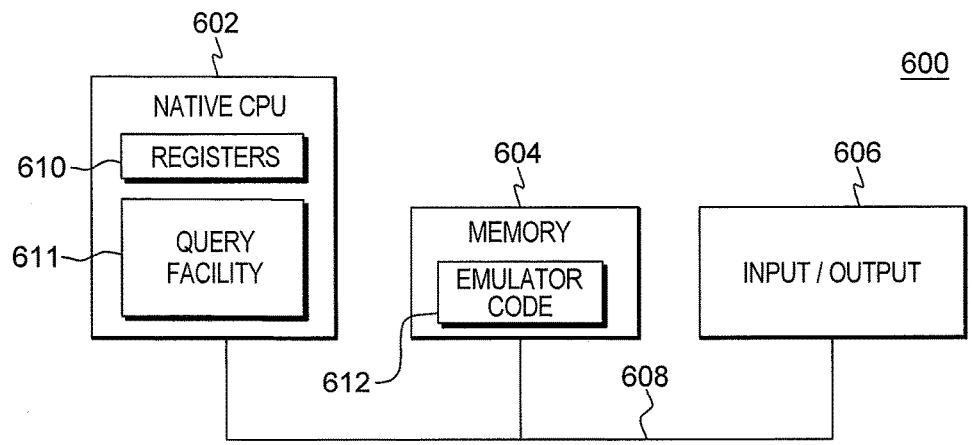
FIG. 6A depicts another example of a computing environment to incorporate and use one or more aspects of the present invention.

In addition to the above, one or more aspects of the present invention may be included and used in other types of computing environments. For instance, another example of a computing environment to incorporate and use one or more aspects of the present invention is described with reference to FIG. 6A. In this example, a computing environment 600 includes, for instance, a native central processing unit (CPU) 602, a memory 604, and one or more input/output devices and/or interfaces 606 coupled to one another via, for example, one or more buses 608 and/or other connections. As examples, computing environment 600 may include a z Systems server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 602 includes one or more native registers 610, such as one or more general purpose registers and/or one or more special purpose registers used during processing within the environment, as well as a query facility 611. These registers include information that represents the state of the environment at any particular point in time.

Moreover, native central processing unit 602 executes instructions and code that are stored in memory 604. In one particular example, the central processing unit executes emulator code 612 stored in memory 604. This code enables the computing environment configured in one architecture to emulate one or more other architectures. For instance, emulator code 612 allows machines based on architectures other than the z/Architecture, such as PowerPC processors, Power Systems servers, HP Superdome servers or others, to emulate the z/Architecture and to execute software and instructions developed based on the z/Architecture.

Figure 6B:
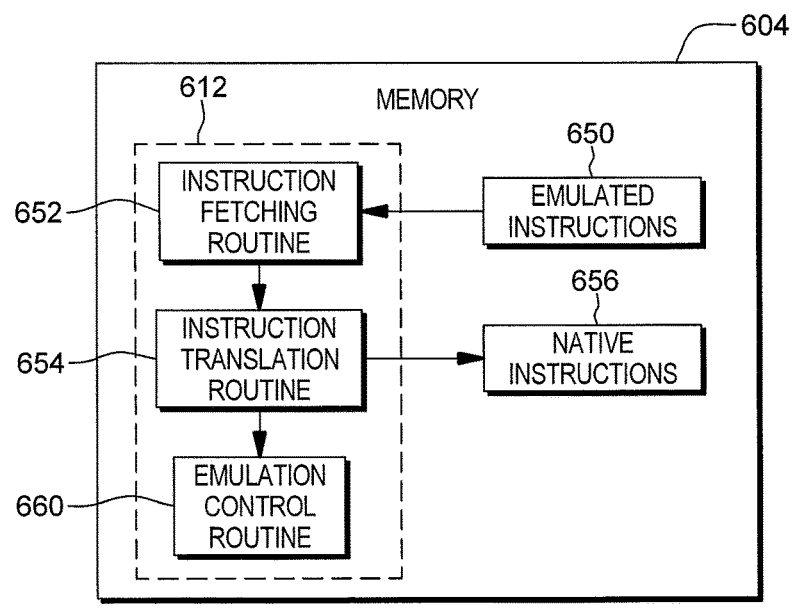
FIG. 6B depicts further details of the memory of FIG. 6A, in accordance with an aspect of the present invention.

Further details relating to emulator code 612 are described with reference to FIG. 6B. Emulated instructions 650 stored in memory 604 comprise software instructions (e.g., correlating to machine instructions) that were developed to be executed in an architecture other than that of native CPU 602. For example, emulated instructions 650 may have been designed to execute on a z/Architecture processor, but instead, are being emulated on native CPU 602, which may be, for example, an Intel Itanium II processor. In one example, emulator code 612 includes an instruction fetching routine 652 to obtain one or more emulated instructions 650 from memory 604, and to optionally provide local buffering for the instructions obtained. It also includes an instruction translation routine 654 to determine the type of emulated instruction that has been obtained and to translate the emulated instruction into one or more corresponding native instructions 656. This translation includes, for instance, identifying the function to be performed by the emulated instruction and choosing the native instruction(s) to perform that function.

Further, emulator code 612 includes an emulation control routine 660 to cause the native instructions to be executed. Emulation control routine 660 may cause native CPU 602 to execute a routine of native instructions that emulate one or more previously obtained emulated instructions and, at the conclusion of such execution, return control to the instruction fetch routine to emulate the obtaining of the next emulated instruction or a group of emulated instructions. Execution of the native instructions 656 may include loading data into a register from memory 604; storing data back to memory from a register; or performing some type of arithmetic or logic operation, as determined by the translation routine.

Each routine is, for instance, implemented in software, which is stored in memory and executed by native central processing unit 602. In other examples, one or more of the routines or operations are implemented in firmware, hardware, software or some combination thereof. The registers of the emulated processor may be emulated using registers 610 of the native CPU or by using locations in memory 604. In embodiments, emulated instructions 650, native instructions 656 and emulator code 612 may reside in the same memory or may be disbursed among different memory devices.

In one example, in accordance with an aspect of the present invention, emulated instructions 650 include a Query Cache instruction to provide residency information and/or other information regarding selected data. The emulated Query Cache instruction is translated, e.g., via, instruction translation routine 654, to a host Query Cache instruction to obtain the information regarding the addressed data, and then results are returned in a manner visible to the emulated instruction.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of executing instructions in a computing environment, said computer-implemented method comprising:
obtaining, by a processor, an instruction for execution in the computing environment, the instruction configured to provide:
an address of data to be queried; and
a plurality of parameters to control searching for the address in one or more caches, the plurality of parameters including a cache level parameter and a control parameter, the cache level parameter providing a cache level indication specifying a particular cache level to commence searching for the address and specifying that one or more other cache levels are available to be searched, and the control parameter indicating up to a selected cache level to be searched for the address, wherein the selected cache level indicates a cache level that is at a level less than all available cache levels; and
executing the instruction, the executing including:
obtaining the address;
searching one or more caches on one or more cache levels for the address, wherein the searching is controlled by the cache level parameter and the control parameter and is not to go beyond the selected cache level defined by the control parameter for searching the address, and wherein the searching is performed, based on the cache level parameter and the control parameter, in at least one cache level between and including the particular cache level and the selected cache level, wherein the between and including the particular cache level and the selected cache level includes a plurality of cache levels but does not include all available cache levels of the computing environment; and
returning information based on the searching.

2. The computer-implemented method of claim 1, wherein the instruction includes an address field and the address is provided by the address field of the instruction.

3. The computer-implemented method of claim 1, wherein the instruction includes a cache level field and the cache level parameter is provided by the cache level field of the instruction.

4. The computer-implemented method of claim 1, wherein the instruction includes a control field and the control parameter is provided by the control field of the instruction.

5. The computer-implemented method of claim 1, wherein the searching includes:
searching a lowest level cache of the one or more caches, the lowest level cache being closest to the processor as compared to other levels of cache;
determining the address is not in the lowest level cache; and
searching, based on determining the address is not in the lowest level cache, one or more next level caches up to the selected cache level to locate the address.

6. The computer-implemented method of claim 1, wherein the control parameter specifies a highest level cache to be searched.

7. The computer-implemented method of claim 1, wherein the plurality of parameters further include a status parameter that defines additional information to be obtained regarding the data.

8. The computer-implemented method of claim 7, wherein the additional information is selected from the group consisting of: status information, use information and latency values.

9. The computer-implemented method of claim 1, wherein the information returned is residency information indicating a cache level in which the address was located.

10. The computer-implemented method of claim 1, wherein the information includes status information regarding the data.

11. The computer-implemented method of claim 10, wherein the status information includes state of ownership of the data, use status of the data, and latency values.

* * * * *